Figure 1:
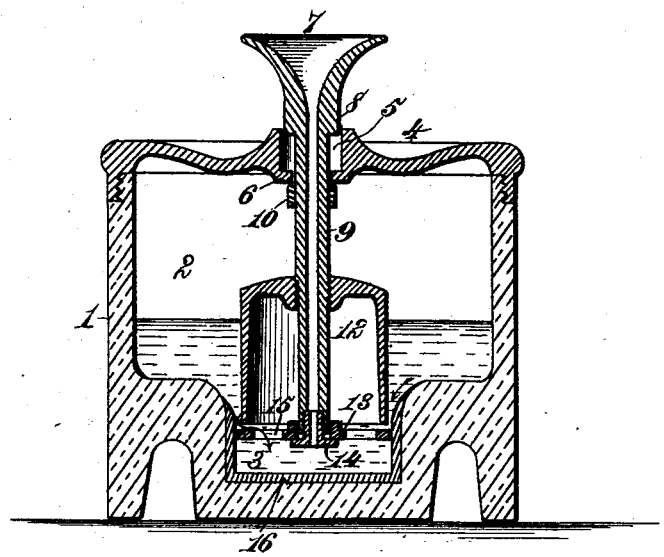

(No Model.)

J. HEBERLING.
FOUNTAIN INKSTAND.

No. 425,674. Patented Apr. 15, 1890.

Witnesses.
Robert Garrett
J. A. Rutherford

Inventor:
John Heberling,
By James L. Norris
Atty

UNITED STATES PATENT OFFICE.

JOHN HEBERLING, OF ROCHESTER, NEW YORK, ASSIGNOR OF ONE-HALF TO MYRON W. SPRAGUE, OF SAME PLACE.

FOUNTAIN-INKSTAND.

SPECIFICATION forming part of Letters Patent No. 425,674, dated April 15, 1890.

Application filed January 9, 1890. Serial No. 336,374. (No model.)

*To all whom it may concern:*

Be it known that I, JOHN HEBERLING, a citizen of the United States, residing at Rochester, in the county of Monroe and State of New York, have invented new and useful Improvements in Fountain-Inkstands, of which the following is a specification.

My present invention relates to that type of inkstands ordinarily known in the market as "fountain-inks," being the same as that shown in two applications for Letters Patent of the United States, filed by me the 13th day of December, 1889, Serial Nos. 333,640 and 333,641.

It is the purpose of my invention to combine with a rising and falling open-mouth or inverted-bell float a piston-diaphragm, whereby upon the depression of the fountain-cup communication between the main ink-reservoir and the fountain-cup shall be wholly cut off, the air and fluid compression being confined to the inverted-bell float and to the ink-well, respectively, for the purpose of enabling the fountain-cup and float to rise more promptly and recover their normal position more rapidly.

It is a further purpose of my invention to combine with an inverted-bell float and with a fountain-cup carried thereby simple means whereby communication between the main ink-reservoir and the well within which the inverted open-mouthed float rises and falls shall be cut off at each depression of the fountain-cup and the air and fluid compression confined to said float and well, while upon the rise of the said cup such communication will be at once restored to permit ink to flow to the well and maintain the supply. In other words, I design combining with the inverted-bell float a species of piston-valve mounted on the stem of the float and moving in the ink-well as the fountain-cup rises and falls, constant communication being maintained between the well and the interior of the float and between the same and the fountain-cup, the piston-valve having a limited movement on the float-stem, whereby communication between the well and the main ink-reservoir or inkstand proper is cut off and resumed as the float and fountain-cup sink and rise, respectively, whereby the escape of the ink from the well or from the lower part of the float to the ink-reservoir when the float is depressed is prevented, the compression confined wholly to the well and float, and the ink caused to flow to the fountain-cup exclusively while the latter rises or lifts more rapidly when the pen is removed therefrom.

The invention consists in the novel features of construction and new combinations of parts hereinafter described and claimed, reference being had to the accompanying drawings, in which—

Figure 2:
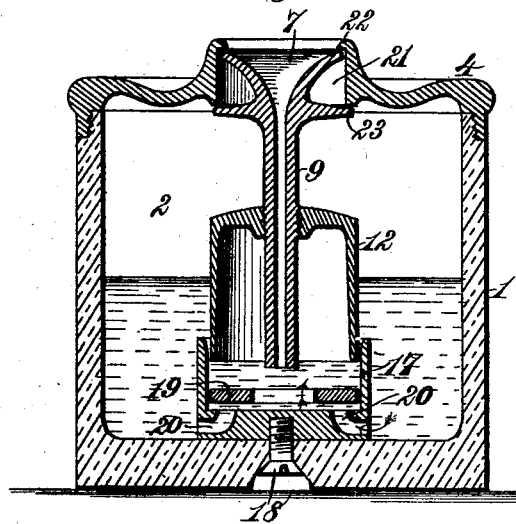
Figure 3:
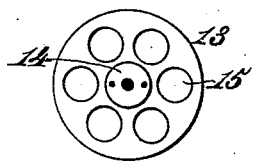

Figure 1 is a central vertical section of an inkstand equipped with my invention. Fig. 2 is a similar section showing a modified construction. Fig. 3 is a plan view of the lower surface of the piston-diaphragm or piston-valve.

In the said drawings the reference-numeral 1 indicates the body of the inkstand, which is made of any size, shape, or ornamentation and of any material suitable for the purpose. It incloses a reservoir 2 of any preferred size, having a central depression or well 3, preferably of circular form and having a depth somewhat greater than the distance through which the fountain-cup sinks in filling with ink.

The reservoir 2 is closed by a cap or cover 4, constructed of the same material as the body 1 or of any different suitable material. The cover may be coextensive with the top of the inkstand, or it may be mounted upon a contracted neck, and in either case the joint is of such construction as will preserve the union of the parts under ordinary circumstances and prevent the escape of ink should the stand capsize, without, however, effecting a hermetical seal.

In the center of the cover I form an opening which receives the tubular stem of the fountain-cup and forms a bearing and guide therefor, the cover being slightly thickened at the center, to provide a bearing of suitable length, although, if preferred, a separate socket piece or bearing may be inserted in the cover for this purpose.

While I may use many different forms of construction without departing from my invention, I prefer one of the two shown in the drawings, and which have the following peculiarities:

The numeral 5 indicates the opening or bearing for the tubular stem, said opening being of greater diameter than the stem, and provided at its lower end with an inwardly-turned collar or flange 6. The fountain-cup 7, which is of any suitable form and size, is provided with a neck 8, which fits within the opening 5, while the tubular stem 9, upon the upper end of which the cup is mounted, fits in a similar manner within the collar 6, the joint being practically tight, but permitting a smooth and easy rise and fall of the parts with the least possible friction. Mounted upon the tubular stem 9 is an elastic or slightly-yielding washer 10, which normally lies beneath and against the collar 6, forming a stop and a packing for the joint, said washer being held against the collar with a slight pressure by the tendency of the fountain-cup to rise, as will be presently explained. The tubular stem drops through the reservoir 2 and into the well 3, nearly to the bottom of the latter, being terminated at a point which will give room for the cup to descend far enough to effect the rise of the ink. Upon said stem is mounted the inverted open-mouthed bell float or compression-cup 12, which may or may not be adjustable on said stem. The open mouth of this cup descends within the well 3 for a short distance, but lies above the open end of the tubular stem and does not make contact with the side or vertical wall of the well.

Upon the lower end of the tubular stem 9 is mounted a piston-diaphragm 13, secured on the stem by a hollow screw or nut 14, tapped into the end of the stem. The piston-diaphragm is of a diameter to fit closely within the well 3, at the same time permitting an unobstructed rise and fall of the fountain-cup, and a slight degree of vertical play is allowed said diaphragm between the flanged head of the screw 14 and the open mouth of the bell-float 12, whereby upon the rise of the fountain-cup and float the latter will lift off the diaphragm, as shown in Fig. 1, while the descent of the fountain-cup will seat the open mouth of the bell-float upon said diaphragm, making a close joint. A series of openings 15 are formed in the diaphragm within the area inclosed by the open mouth of the float.

The reservoir 2 being supplied with a suitable quantity of ink, and the parts described being in position for operation, the pen is placed in the fountain-cup, and a very slight downward pressure being exerted upon the fountain-cup it will sink and seat the bottom of the float upon the piston-diaphragm, which will in turn descend within the well 3. The ink, having no other avenue of escape, will flow through the openings 15 in the piston-diaphragm, producing a compression of air within the bell-float, which drives the ink upward in the tubular stem and fountain-cup, filling the latter in an instant. As the pen is removed from the cup, the compression within the float causes it to rise with speed, and at the same time it lifts off the piston-diaphragm, allowing communication between the well 3 and reservoir 2 to be resumed, as shown by the arrows in Fig. 1.

I may employ any suitable device for locking the fountain-cup and stem in such position as to retain the ink in said cup—such, for example, as the means shown in my applications for patent hereinbefore referred to. It will be seen, however, that I may dispense with the packing-ring on the lower end of the tubular stem, as this is not needed with the present construction.

I may set a lining 16 of any suitable material—such as hard rubber—within the well 3, the interior surface of which may be readily and cheaply polished to give a close fit upon the piston-diaphragm with the minimum amount of friction.

I may substitute for the construction described that shown in Fig. 2, in which the body of the stand may be of any usual form, the centrally-sunken well 3 being dispensed with. In place thereof I substitute a cup 17, centrally located and formed of any suitable material—such as hard rubber or glass—said cup being fastened in place by a screw 18, passing through the bottom of the stand and tapped into the bottom of the cup or by any other suitable means.

The bell-float 12 is mounted on the tubular stem in the manner described; but the piston-diaphragm is dispensed with and in place thereof a valve-ring 19 is used. This ring fits within the cup 17 and overlies openings 20, by which communication is effected between the ink-reservoir 2 and the interior of the cup.

The bell-float 12 is ground into the cup 17 or otherwise constructed to fit therein in such manner as to prevent the escape or entrance of ink over the top of the cup and between it and the float.

The reservoir is filled with ink, which rises above the top of the cup 17, and upon the descent of the fountain-cup and float the ring-valve, which is seated in the opening 20, closes the same tightly by reason of the pressure of the ink thereon, cutting off all escape, save by way of the tubular stem, and confining the air and fluid compression to the cup 17 and float 12. As the fountain-cup rises, a slight lift is given the ring-valve by reason of the fact that there is always a want of equilibrium between the ink in the reservoir 2 and that in the cup 17, for obvious reasons. In other words, inasmuch as the valve-ring seats itself upon the openings, there will be tendency to rise, unless, as the cup and float rise, there is some degree of exhaust or suction after the depression caused by the descent of the float has raised the latter. If the consumption of ink in the cup has disturbed the equilibrium between the compression in the well and float and the pressure of the ink to enter the valve-openings, the ring-valve will rise and ink will flow to the cup, thus maintaining the supply. In the construction shown in this figure the fountain-cup is wholly contained within and moves in an enlarged socket-bearing 21, formed in the cover and having an inwardly-turned flange 22 at its upper end. A collar 23, mounted on the tubular stem, takes the place of the packing ring or collar shown in Fig. 1.

What I claim is—

1. In a fountain-inkstand, the combination, with a fountain-cup having a tubular stem, of an open-mouthed inverted cup or bell float mounted on said stem, and a perforated piston-diaphragm moving in a central well and mounted and having limited vertical play upon the end of the tubular stem, substantially as described.

2. In a fountain-inkstand, the combination, with a suitable reservoir, of a fountain-cup mounted on a tubular stem which rises and falls in a guide or bearing, an open-mouthed inverted cup or bell float mounted on said stem, and a valve upon which said float seats as it descends and off which it lifts in rising, said valve closing and opening communication between the main reservoir and the well or cup in which it lies, substantially as described.

3. In a fountain-inkstand, the combination, with a main reservoir having a central well, of a tubular stem rising and falling in a suitable bearing and having a fountain-cup on its upper end, its lower end descending in the well, an open-mouthed inverted cup or bell float mounted on said stem and having its mouth lying in the well, and a piston-diaphragm loosely mounted on the lower end of said stem, its edge fitting within the well and its body provided with openings within the area inclosed by the mouth of the float, substantially as described.

4. In a fountain-inkstand, a tubular stem carrying a fountain-cup, an open-mouthed inverted cup or bell float mounted on said stem, an ink-reservoir having a central cup or well in which said float rises and falls, and a piston diaphragm or valve fitting within said well or cup and rising and falling with the rise and fall of the float, substantially as described.

5. In a fountain-inkstand, the combination, with an ink-reservoir, of a tubular stem carrying a fountain-cup and rising and falling in a bearing in the cover of the stand, an open-mouthed inverted cup or bell float lying partly in a central well in the bottom of the reservoir, and a piston-diaphragm mounted on the lower end of the stem and held thereon by a hollow screw tapped into the end of the stem, said piston being perforated to enable the well to communicate with the interior of the float, substantially as described.

In testimony whereof I have affixed my signature in presence of two witnesses.

JOHN HEBERLING.

Witnesses:
JOHN E. DURAND,
MYRON W. SPRAGUE.